US012726800B2

(12) United States Patent
Urbanek et al.

(10) Patent No.: US 12,726,800 B2
(45) Date of Patent: Sep. 1, 2026

(54) TARGETED USER EXPERIENCES ON 5G WIRELESS NETWORKS

(71) Applicant: Boost SubscriberCo L.L.C., Englewood, CO (US)

(72) Inventors: Robert Urbanek, Overland Park, KS (US); Marcel Guajardo, Englewood, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 614 days.

(21) Appl. No.: 18/185,320

(22) Filed: Mar. 16, 2023

(65) Prior Publication Data

US 2024/0314530 A1 Sep. 19, 2024

(51) Int. Cl.
*H04W 4/08* (2009.01)
*H04W 4/50* (2018.01)
*H04W 4/60* (2018.01)

(52) U.S. Cl.
CPC .................................... *H04W 4/50* (2018.02)

(58) Field of Classification Search
CPC ............ H04W 4/50; H04W 4/08; H04W 4/60
See application file for complete search history.

(56) References Cited

U.S. PATENT DOCUMENTS

2019/0037335 A1* 1/2019 Steck .................... H04W 8/186

FOREIGN PATENT DOCUMENTS

EP 3764678 B1 * 11/2023 ............ H04W 8/205

* cited by examiner

*Primary Examiner* — Joseph E Dean, Jr.
(74) *Attorney, Agent, or Firm* — KW Law, LLP

(57) ABSTRACT

A user experience management platform delivers custom user experiences to user devices on a cellular network. A user-experience (UX) configuration is generated for the cellular network. The UX configuration corresponds to a group identifier (GID) parameter or a device identifier. A communication including the GID parameter is received from a user device. The user device may read the group identifier from a subscriber identity module (SIM) card installed in the user device. A plurality of UX elements from the UX configuration are identified as corresponding to the identifier. A UX element from the plurality of UX elements is determined to be currently unavailable on the user device, and the UX element is provisioned to the user device in response to identifying the UX element as currently unavailable.

20 Claims, 3 Drawing Sheets

TARGETED USER EXPERIENCES ON 5G WIRELESS NETWORKS

TECHNICAL FIELD

The following generally relates to wireless data networks, such as 5G wireless networks. More particularly, the following relates to systems, devices and automated processes to share resources amongst multiple guest networks within a 5G or similar wireless network.

BACKGROUND

Wireless networks that transport digital data and telephone calls are becoming increasingly sophisticated. Currently, fifth generation (5G) broadband cellular networks are being deployed around the world. These 5G networks use emerging technologies to support data and voice communications with millions, if not billions, of mobile phones, computers and other devices. 5G technologies are capable of supplying much greater bandwidths than was previously available, so it is likely that the widespread deployment of 5G networks could radically expand the number of services available to customers.

For example, some attempts have been made to share assigned spectrum between multiple networks. These attempts have faced various challenges. The so-called “neutral host” model, for example, allows one network provider to lease bandwidth on its own network to other parties. The neutral host generally recognizes the lessee’s “roaming” traffic on its own network, and then forwards such traffic to the lessee, generally for a fee. In this model, however, the “neutral host” maintains full access and control of its own network, so the other providers that are leasing space on the network must relinquish a substantial amount of flexibility, security, and control over their data traffic. And even to the limited extent that some wireless providers may lease dedicated portions of their spectrum to other providers, this access still lacks the flexibility and independence that are generally desired from operating an independent network to deliver tailored customer experiences.

There is an increased demand for marketing and selling telecommunications services to specific, targeted customer segments. The Mobile Virtual Network Operator (MVNO), for example, has been successful in this approach targeting segments across affordability, geographic, and billing needs. The access has been so notable that some MVNOs have been acquired by Mobile Network Operators (MNOs) such as, for example, the acquisition of TracFone by Verizon®. Some MNOs have begun investing in their own internal brands in an attempt to replicate the marketing successes of MVNOs (e.g., Visible by Verizon®). There is also a desire to prototype new brands that are distinct from the parent company brands or to separate consumer from enterprise brands. There is an opportunity to empower all MNO customers with a way to prototype, design, deploy, and manage multiple brands of services concurrently.

A substantial desire therefore exists to build systems, devices and automated processes that facilitate convenient customization of a user experience between multiple network operators. In particular, there is a need to flexibly and efficiently share radio resources amongst multiple guest network operators while allowing the guest operators to independently deploy a wide range of network services to customers.

BRIEF SUMMARY

Various embodiments support 5G access with various user experiences on a single mobile network operator (MNO).

Guest operators can instantiate their own virtualized network functions without the need to obtain and manage the physical resources otherwise needed to support wireless communications. Guest operators (e.g., business enterprises, government entities and/or the like) can implement their own network services using, for example, their own 5G core, IP multimedia system (IMS), virtual centralized units (CUs), virtual distributed units (DUs), operations/business support system (OSS/BSS) and/or the like. These service modules communicate with user equipment (UE) via spectrum and radio capabilities that are granted by a network host. Guest network operators can maintain control over the virtualized backend modules that provide the actual network services without the host network needing access to the underlying data or limiting the services that are provided by the guest. Various embodiments therefore allow guest network operators to deliver customized user experiences to different customers and customer segments through a 5G network. Such experiences can be delivered quickly and efficiently without the guest network operator needing to obtain its own hardware, antennas, spectrum, or other components.

This general concept enables a wide range of customization that was previously impractical, if not impossible, to deliver on traditional cellular infrastructure. Enterprises and manufacturers, for example, could build and operate their own 5G networks to support their own unique services while serving the geographic locations with a user experience tailored to those locations.

Systems, devices, and processes for delivering targeted user experiences are disclosed herein. An example process includes the step of generating a user-experience (UX) configuration for a cellular network. The UX configuration corresponds to a group identifier (GID) parameter. A communication including the GID parameter is received from a user device. The user device reads the group identifier from a subscriber identity module (SIM) card installed in the user device. A plurality of UX elements from the UX configuration are identified as corresponding to the GID parameter from the SIM card. The process may also determine whether the user device lacks a UX element from the plurality of UX elements, and provision the user device with the UX element in response to determining the user device lacks the UX element.

Various embodiments identify the plurality of UX elements by retrieving a list using the GID parameter. The list includes the UX elements from the UX configuration. Generating the UX configuration may comprise selecting the UX elements for the UX configuration associated with a demographic, assigning the GID to the demographic, and storing the UX configuration comprising the selected UX elements. The UX configuration is stored in association with the GID parameter. The SIM card may be selected from a plurality of SIM cards to provision the UX elements associated with the GID on the user device. The user device may be provisioned with the UX element by updating a network service to authorize access to the UX element by the user device. The user device may be provisioned with the UX element by transmitting a visual element to the user device or by installing an application on the user device. A guest operator may select the UX elements for provisioning by a mobile network operator (MNO) of the cellular network.

An automated process for execution by a mobile network operator to deliver custom user experiences includes generating a plurality of user-experience (UX) configurations for a cellular network. A communication is received from a user device and includes an identifier corresponding to a UX configuration from the plurality of UX configurations. The UX configuration corresponds to the identifier and includes a plurality of UX elements. The process includes the steps of identifying a UX element from the plurality of UX elements as unavailable on the user device, and provisioning the UX element to the user device in response to identifying the UX element as unavailable on the user device.

Various embodiments of the identifier include a device identifier or a group identifier. The UX configuration may be generated by selecting the UX elements for the UX configuration associated with a demographic, assigning the identifier to the demographic, and storing the UX configuration comprising the selected UX elements in association with the identifier. The user device is provisioned with the UX element by updating a network service to authorize access to the UX element by the user device, transmitting a visual element to the user device, or installing an application on the user device. A guest operator selects the UX elements for provisioning by a mobile network operator (MNO) of the cellular network.

A process for execution by a user device with a subscriber identity module (SIM) card installed to deliver a custom user experience comprises transmitting a communication from the user device to a cellular network operator. The communication includes a group identifier from the SIM card to identify a user experience (UX) configuration for the user device. The process includes identifying a UX element for provisioning on the user device in response to the UX configuration associated with the group identifier including the UX element.

Various embodiments include the steps of terminating an old UX element running on the user device in response to identifying the UX element for provisioning, installing the UX element on the user device to replace the old UX element, and launching the UX element on the user device. The UX configuration may inherit the UX elements from a parent UX configuration. The UX configuration comprises top-level UX elements for the user device, and a second UX configuration comprises sub-level UX elements for the user device. The UX element is selected by a guest operator of the cellular network in response to a demographic associated with the group identifier.

Other embodiments may provide other systems, devices and automated processes relating to dynamic allocation of 5G wireless resources, as described in additional detail below.

DRAWING FIGURES

The subject matter of the present disclosure is particularly pointed out and distinctly claimed in the concluding portion of the specification. A more complete understanding of the present disclosure, however, may be obtained by referring to the detailed description and claims when considered in connection with the illustrations.

DETAILED DESCRIPTION

Figure 1:
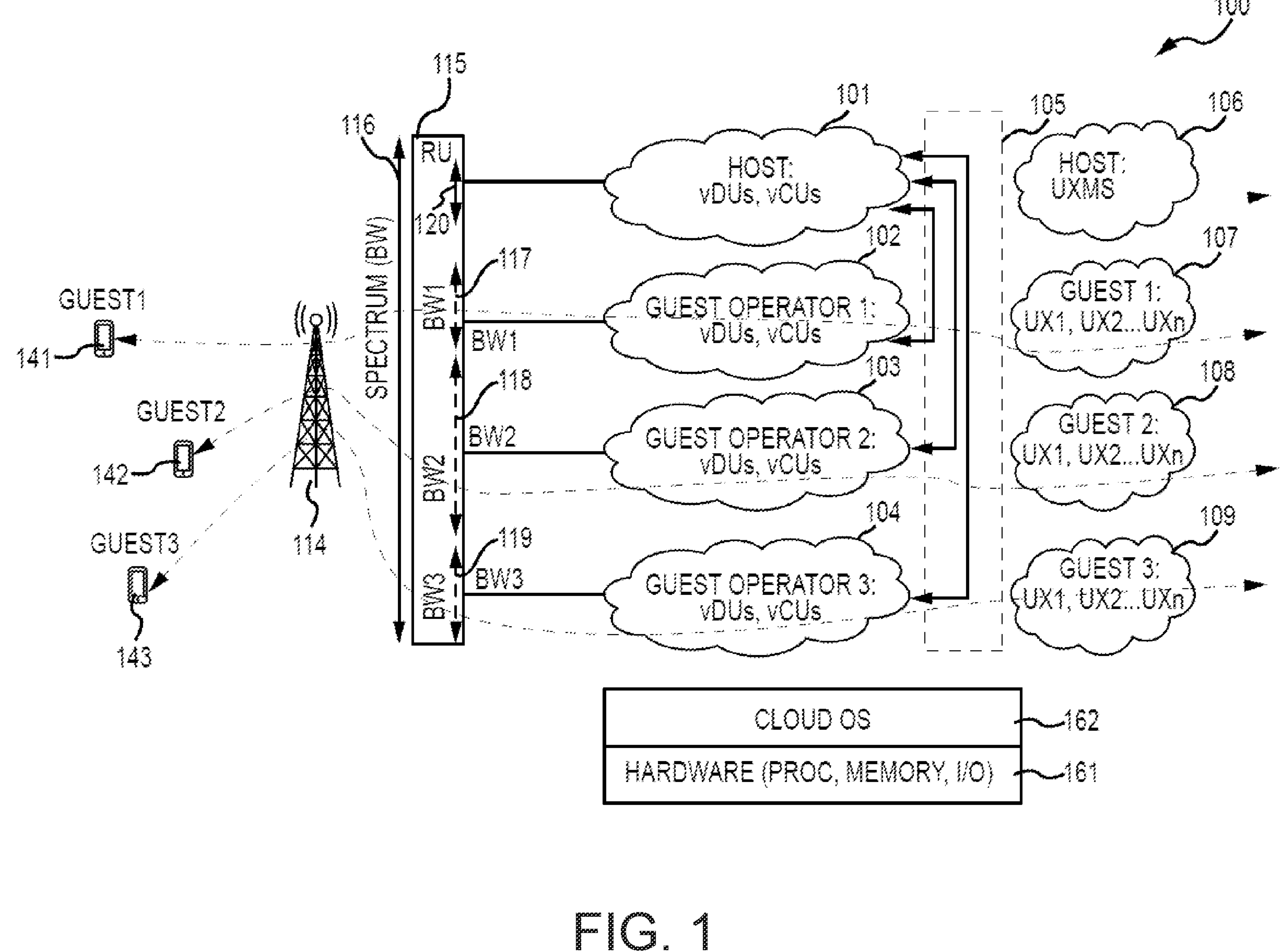
FIG. 1 illustrates an example of a system for implementing a wireless network with shared access and custom user experiences, in accordance with various embodiments.

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

A mobile network operator (MNO) supports multiple mobile virtual network operators (MNVO) that maintain different user experiences for their clients using the same underlying network. The MNO enables MNVOs on its system by allocating resources on its own radio units for use by one or more MNVOs (also referred to as guest network operators). This allocation can take place using a provisioning plane that allows guest network operators to select desired times of availability, geographic locations, amounts of bandwidth/available spectrum bands, and/or other parameters as desired. The provisioning plane communicates with the particular radio unit(s) within the 5G network system to apportion the available spectrum amongst the various guest operators as desired. In various embodiments, each guest operator maintains its own virtualized network functions (e.g., DUs, CUs, 5G Core, IMS, OSS/BSS), thereby maintaining security and control of its own end-to-end network. Furthermore, each MNVO controls the user experience on its network.

In some embodiments, MNVOs may use a platform hosted by the MNO to configure branding features across all marketing, devices, MNO rate plans, customer pricing and billing, distribution channels, and pertinent value-added services (VAS). The MNO's platform may also launch applicable sales and customer relationship management (CRM) tools. An example embodiment includes multicultural advertising made possible by tailoring the entire user journey across shopping, buying, using, paying, and supporting. In various embodiments, the MNO branding platform described herein may promote brand consistency, tailor billing (prepaid and postpaid options) based on target market segments, select and deploy pertinent customer service tools (e.g., voice, text, chat, e-mail, etc.), manage brand preferences (e.g., white-label options) for third-party, pre-certified VAS (e.g., security, device insurance, entertainment apps, etc.), or bundle third-party, pre-certified entertainment and media apps quickly and easily via integrated billing. For the MNO's customers (e.g., guest network operators), the brand management platform may enable management of brands across many aspects of the customer experience.

Various embodiments of the management platform may tailor the user experience across various aspects of a cellular network. Customized MVNOs may offer multicultural advertising to narrow subcultures by tailoring the experience of a cellular user across shopping, buying, using, and support on a cellular network. For example, marketing, sales, and billing can be customized for different cultural, Latino sub segmentation (e.g., for Cuban-American groups in Miami, Puerto-Rican groups in New York, Mexican-American groups with a twist of Texan influence in Texas, Mexican-American groups in Southern California, or Dominican-American groups in Boston). Continuing the foregoing example, the management platform would enable guest operators to tailor user experiences for both acculturated and unacculturated generations of Latino subsegments, regardless of ethnic identification or preference.

Systems, methods, and devices of the present disclosure customize the user experience (UX) by device for users on a cellular network hosted by an MNO. For example, a cellular carrier may offer a carrier, customization and configuration (CCC) app for automated provisioning of device authorizations and app downloads at the device level. This enables MVNOs to force installation or uninstallation of third-party apps (e.g., Facebook®), and the MNVO-specific installations may include custom configurations for third-party applications (e.g., wallpapers, bookmarks, contacts, security settings, language preferences) automatically configured to users. Guest operators may also customize and brand their customer care app, carrier-to-subscriber text messaging, and notifications about new functionality. VAS services can be automatically downloaded with preset default settings (e.g., parental controls, content filters, cybersecurity settings, etc.) based on other user preferences or settings (e.g., downloads may have content controls enabled in response to installation on a device with child controls enabled). Guest operators may also right-size billing options for multiple customer segments with options such as prepaid or postpaid services. Guest operators may also support top-level brands and child brands with matched billing preferences to child brands based on factors such as income tiers, credit scores, educational attainment, and the like.

Various embodiments enable white-labeled VAS products from third-parties (e.g., security, device insurance, entertainment apps, etc.). The multi-brand management infrastructure described herein allows for the VAS services to be white-labeled according to top-level brands and sub-brands or child brands. The management platform described herein empowers wholesale customers and internal brands operating on the MNO to customize the experience for their customers. The management infrastructure also supports an open environment across network infrastructure, without vendor lock-in or exclusivity in some embodiments.

The management platform may deliver a custom user experience to a user device based on data stored on a subscriber identity module (SIM) card (e.g., a digital SIM, an eSIM, or a traditional SIM card) installed on the device. For example, group identifier (GID) fields in the SIM card may be used to trigger custom user experience settings. The customer user experience may also be triggered in response to a provisioning payload identifying the particular custom user experience that a device should receive. In that regard, a single device on a single network hosted by a single MNO could receive many different combinations of settings, apps, and network services. Various embodiments include user equipment (UE) connected to the same underlying MNO, with the experience on different UE managed differently in response to the network, the SIM card, the device, or an application.

With reference now to FIG. 1, an example cellular communication system 100 is shown, in accordance with various embodiments. Cellular communication system 100 includes a host operator maintaining ownership of one or more radio units (RUs) 115 associated with a wireless network cell. The example of FIG. 1 depicts a host operator operating a "radio/spectrum as a service (R/SaaS)" that allocates bandwidth on its own radio units for use by one or more guest network operators. Examples of guest network operators may include internal brands of the host operator, system integrators, enterprises, external MVNOs, or converged operators. The host and guest network operators may maintain desired versions of software on user equipment (UE) 141, 142, 143, with each UE capable of running a custom user experience (UX).

As used herein, the term UX encompasses characteristics experienced by a user on UE connected to a network. Components of a user experience may include network access, bandwidth, data speeds, voice access, branding, billing, sales, support, installed apps, roaming capabilities, geographic coverage, network applications, core applications, or other features experienced through UE connected to a cellular network. While FIG. 1 depicts a R/SaaS example, other rudimentary cellular network configurations may be used to deliver custom UX on UE connected to host network 101, as described herein. R/SaaS systems are described in detail in U.S. patent application Ser. No. 17/566,945, which is incorporated herein by reference for any purpose.

In the example of FIG. 1, each RU 115 communicates with UE 141, 142, 143 operating within a geographic area using one or more antennas/towers 114 capable of transmitting and receiving messages within an assigned spectrum 116 of electromagnetic bandwidth. In various embodiments, guest networks 102, 103, 104 interact with a provisioning plane 105 to obtain the desired spectrum (e.g., portions of bandwidth 117, 118, 119 respectively) across one or more of the RUs 115 operated by the host 101. Provisioning plane 105 allows guest network operators to obtain or change their assigned bandwidths on different RUs 115 on an on-demand and dynamic basis. Guest UX configurations 107, 108, 109 may be setup using host UX management system (UXMS) 106. UXMS 106 may host and manage software deployed on UE 141, 142, 143 in accordance with various UX configurations specified by guest operators 102, 103, 104. Host 101 may also host its own UX configurations to deploy custom UX to UE 141, 142, 143 services on host network 101.

The Open RAN standard breaks communications into three main domains: the radio unit (RU) that handles radio frequency (RF) and lower physical layer functions of the radio protocol stack, including beamforming; the distributed unit (DU) that handles higher physical access layer, media access (MAC) layer and radio link control (RLC) functions; and the centralized unit (CU) that performs higher level functions, including quality of service (QOS) routing and the like. The CU also supports packet data convergence protocol (PDCP), service data adaptation protocol (SDAP) and radio resource controller (RRC) functions. The RU, DU and CU functions are described in more detail in the Open RAN standards, as updated from time to time, and may be modified as desired to implement the various functions and features described herein. In the example of FIG. 1, host 101 maintains one or more DUs and CUs as part of its own network. The DU suitably communicates with one or more RUs 115, as specified in the Open RAN standard.

The various network components shown in FIG. 1 are typically implemented using software or firmware instructions that are stored in a non-transitory data storage (e.g., a disk drive or solid-state memory) for execution by one or more processors. The various components shown in FIG. 1 can be implemented using cloud-based hardware 161 and an appropriate operating system 162 such as the Amazon Web Service (AWS) platform provided by Amazon Inc., although other embodiments could use other cloud platforms and/or any type of conventional physical computing hardware 161, as desired.

As illustrated in the example of FIG. 1, system 100 includes a host network 101 and one or more guest networks 102, 103, 104. The host network 101 is typically operated by an organization that owns radio equipment and sufficient spectrum (potentially on different bands) to offer 5G capacity and coverage. Host network 101 provides 5G service to its own UEs, and it manages UX software and services on its own UEs or those of its guest operators. Host network 101 includes at least one DU and at least one CU, both of which will typically be implemented virtually using cloud resources. If host network 101 provides container management services, then it may also possess software management services described in greater detail below.

Guest networks 102, 103, 104 operated by guest operators can manage their own networks using allocated portions of the bandwidth 117, 118, 119 handled by one or more of the RUs 115 associated with the host 101. The guest networks 102, 103, 104 communicate with one or more UEs 141-143 using allocated bandwidth 117, 118, 119 on the host's RU 115. Guest networks 102, 103, 104 may include one or more virtual DUs and CUs, as well as container management server (CMS), as desired. Generally, one or more guest operators will instantiate its own 5G virtualized network functions (e.g., CMS, vCUs, vDUs, etc.) using cloud-based resources, as noted above. However, various embodiments may operate outside of cloud-based environments. Host network 101 may also generate its own UX configurations in UXMS 106 to manage software and services deployed or running on UE 141-143. Some embodiments may include host 101 implementing host UXMS 106 through wireless communication with UE 141-143, without guest operators hosting guest networks.

Guest operators lease or otherwise obtain any needed 5G access for its planned services, capacity and coverage based on an arrangement with the host provider. A guest provider may then operate and manage its own 5G network 102, 103, 104 independently of the host 101 and the other guests. UXMS 106 aligns all the entities including the host and the guests. A network operator can optimize its own network for unique target services by intelligently targeting its access, services, branding, billing, apps, software, and other UX components to particular users or user segments.

Each RU 115 is typically associated with a different wireless cell that provides wireless data communications to user devices 141-143. RUs 115 may be implemented with radios, filters, amplifiers and other telecommunications hardware to transmit digital data streams via one or more antennas 114. Generally, RU hardware includes one or more processors, non-transitory data storage (e.g., a hard drive or solid state memory) and appropriate interfaces to perform the various functions described herein. RUs are physically located on-site with the transmitter/antenna 114, as appropriate. Conventional 5G networks may make use of any number of wireless cells spread across any geographic area, each with its own on-site RU 115. UXMS 106 of host network 101 implementing UX configurations 107, 108, 109 of guest networks 102, 103, 104 monitors software deployed and services accessed on each UE communicating with RU 115. Monitoring statistics, data, analytics, and other information may be accessible by guest networks through UXMS 106, which may include dashboarding and other tools to administer custom UX to connected UE 141, 142, 143.

RUs 115 support wireless communications with any number of user devices 141-143. UE 141-143 are often mobile phones or other portable devices that can move between different cells associated with the different RUs 115, although 5G networks are also widely expected to support home and office computing, industrial computing, robotics, Internet-of-Things (IoT), and many other devices. While the example illustrated in FIG. 1 shows one RU 115 for convenience, a practical implementation will typically have any number of RUs 115 that can each be individually configured to provide highly configurable geographic coverage for a guest network, if desired. UXMS 106 may validate that UX configurations 107, 108, 109 match the UX running on UE 141, 142, 143. Validation may be performed at regular intervals, on UE provisioning, on UE reboot, in response to UE communicating with a different RU 115 of cellular communication system 100, or on any number of other triggering conditions.

Host 101 and guest operators 102, 103, 104 can automatically scale and manage UX using the UXMS 106 and UX configurations 107, 108, 109 described herein. If a UE is throwing errors, over consuming resources, or looping uncontrollably on UE 141-143, host 101 or guests 102-104 can validate that the installation on a given UE matches the corresponding UX config. Host 101 and guests 102-104 may also stagger updates and software rollouts over cellular communication system 100. Container updates may be staggered to manage traffic and avoid large outages or data slowdowns. Host 101 and guests 102-104 monitor UE 141-143 for problematic operations or problematic installations and repair, replace, or remove problematic apps across all devices using a UX config. Due to their positions in the cellular network, host 101 and guest operators 102-104 monitor the health and operation of UE 141-143 continuously or at regular intervals in response to UE 141-143 connecting to cellular communication system 100.

In various embodiments, UE 141-143 each include an operating system, which can have different features enabled for different UX configurations. For example, UE 141-143 in communication with a 5G cellular network could be smart watches, smart phones, laptops, personal computers, servers, internet of things (IoT) devices, connected automobiles, or other distributed computing resources connected to the cellular network, each with its own UX config depending on the user's market segments and preferences.

Figure 2:
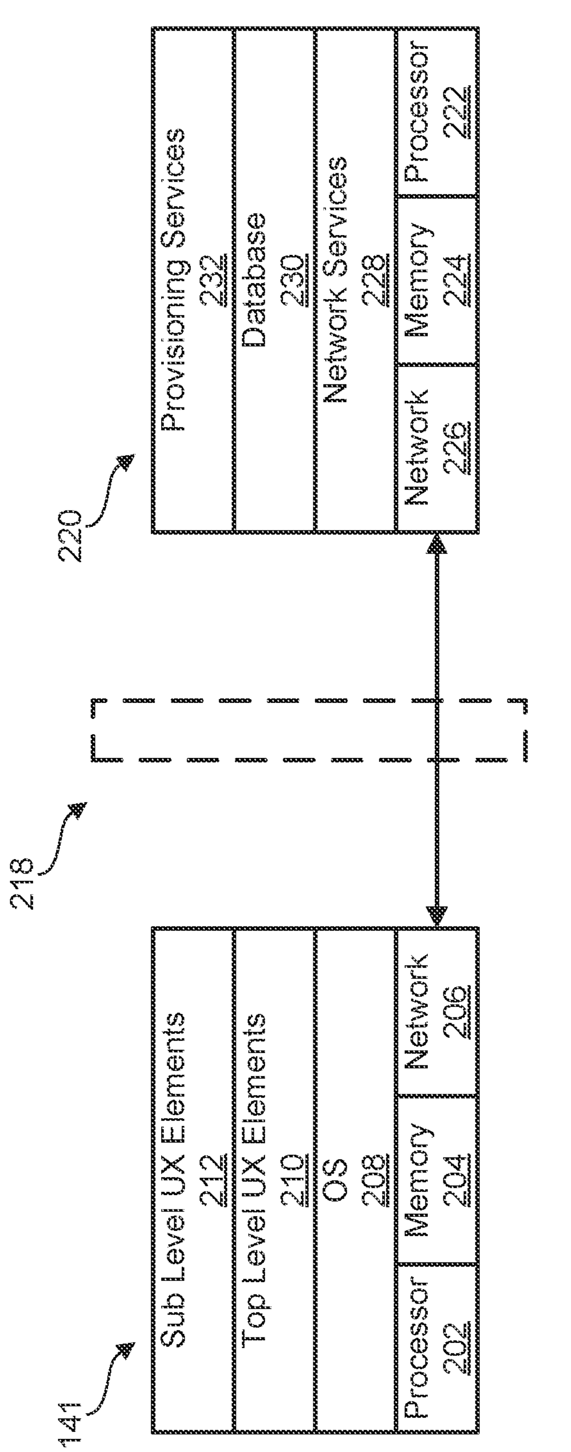
FIG. 2 illustrates an example of a user device delivering a custom user experience on a shared network, in accordance with various embodiments.

With reference to FIG. 2, UE 141 is shown in communication with UXMS 220, in accordance with various embodiments. UE 141 includes processor 202, memory 204, and network interface 206. An operating system (OS) 208 may be loaded into memory 204 and executed by processor 202 in response to UE 141 booting. UE 141 may include a device identifier or a SIM card readable by processor 202. UE 141 communicates the device identifier or SIM data to UXMS 220 to identify the custom UX components available for UE 141. User experiences may be provisioned to a device based on the network the device is connected to, the SIM installed on the device, the device itself, or the applications installed on the device.

In various embodiments, a SIM card may include GID fields. Some embodiments include a first GID parameter and a second GID parameter in the same SIM card. The GID fields may be used by UXMS to identify the custom US for UE 141. For example, the first GID parameter may identify the top level UX elements 210 (e.g., a parent branding configuration) for UE 141, and the second GID parameter may identify the sub-level UX elements 212 (e.g., a child branding configuration) for UE 141. In that regard, a single GID parameter or both GID parameters in combination may serve as a key to identify the custom UX features available to UE 141. Some embodiments include UX features accessible using only a sub-level identifier (e.g., a child brand), and the sub-level inheriting available UX elements from the top level UX (e.g., the parent brand) above the sub-level UX.

Top level UX elements 210 and sub-level UX elements 212 may include base software libraries, dependencies, resource allocation tools, and security features accessible by or used to manage UE 141. Top level UX elements 210 and sub-level UX elements 212 may also include custom branding, billing, access packages, content, applications, geographic restrictions, or other features and limitations applicable in the custom UX of UE 141.

The various components of UXMS 220 shown in FIG. 2 can be implemented using cloud-based hardware and an appropriate operating system, although other embodiments could use other cloud-based platforms and/or any type of conventional physical computing hardware, as desired. Examples of suitable hardware for running UXMS 220 include processor 222, memory 224, and network interface 226.

UE 141 communicates over cellular network 218 with UXMS 220. Network interface 206 transmits cellular communications through a cellular communication system (e.g., system 100 of FIG. 1) to UXMS 220. UE 141 regularly communicates with and through the cellular network to maintain cellular network connectivity. UXMS 220 of the cellular network thus has regular contact with UE 141, in response to which UXMS 220 verifies that top level UX elements 210 and sub-level UX elements 212 are installed, accessible, updated, running, or otherwise in the condition on UE 141 specified by the corresponding UX config.

In some embodiments, UE 141 contacts UXMS 220 directly to validate top level UX elements 210 and sub-level UX elements 212 in response to UE 141 rebooting or booting for the first time. UE 141 may also contact UXMS 220 to validate top level UX elements 210 and sub-level UX elements 212 in response to UE 141 moving into another service cell, in response to launching an app, in response to a predetermined duration passing, in response to UXMS 220 polling UE 141, or in response to any suitable trigger for validation.

Embodiments of UXMS 220 include network services 228 supported by host 101 and system 100 of FIG. 1. Network services 228 maintains a database 230 of information related to top level UX elements 210 and sub-level UX elements 212 installable in response to particular corresponding UX configurations. Database 230 may include device identifiers associated with UX configurations or GID parameters (e.g., stored on SIM cards on UE) associated with UX configurations. Database 230 may also include device configurations, OS versions, compatibility lists, or other criteria to assess top level UX elements 210 and sub-level UX elements 212 deployed to UE 141. Network services 228 may also log past installations on UE 141, function calls made by UE 141, interactions between UE 141 and cellular network 218, or other activity of interest in maintaining top level UX elements 210 and sub-level UX elements 212 running on UE 141. Logs, for example, support assessment of installed or running UX elements as well as trouble shooting device errors. Database 230 may be a relational database, unstructured data store, flat file, structured file, data lake, or any other data storage structure or combination thereof. For example, network services 228 may tag UX installations, UE identifiers, GID parameters, and resource controls in an unstructured data store to apply limitations to UE 141. The tags may be transmitted to OS 208 during installation of top level UX elements 210 and sub-level UX elements 212 (collectively, UX elements) by UXMS 220 to implement the limitations on UE 141.

Provisioning services 232 are maintained by host 101. Provisioning services 232 maintain data regarding UX elements installed on UE 141, in association with devices and device types, to enable centralized analysis of aggregated metrics across market segments and user demographics. Network services 228 log information from various devices and device types in response to requests, UX updates, UX errors, or other triggering events of interest. The data may be aggregated to assess, for example, whether a particular UX element is throwing errors, whether a combination of user equipment and UX configurations appear incompatible, whether a UX element running on a device or class of devices is consuming unexpected resources, or other detectable deviations from desired state. Data logged by network services 228 can also be used to troubleshoot UE 141 having trouble communicating on cellular network 218.

In various embodiments, provisioning services 232 read records from database 230 to identify UX elements deployed to or accessible by UE 141 with old revision numbers, security vulnerabilities, or other flaws that trigger UXMS 220 to update a UX element for UE 141. Provisioning services 232 thus tend to maintain current custom UX installations on UE 141. Network services 228 may also check for updates to UX elements in response to UE 141 restarting, a poll sent to UE 141, UE 141 accessing a UX element, UE 141 making a function call to network services 228, or other suitable triggers. Discovery system may use a revision number or hash value received from the UE 141 to assess the current version of UX elements deployed to UE 141 and determine whether to push an update.

Guest operators access provisioning services 232 on UXMS 220 to setup, add, modify, delete, or otherwise manage UX configurations corresponding to demographics, locations, UE types, or other characteristics suitable for organizing custom user experiences, in accordance with various embodiments. UXMS 220 supports checks for updates to UX elements; requests to download UX elements to run new applications; triggering updates by network services 228 in database 230 of added, deleted, or modified UX elements; or triggering storage of data from containers for future access, for example. Through function calls, various types of user equipment can interact with network services 228 and cellular network 218 to manage available UX elements. The same UX configurations may thus run on any compatible OS 208 deployed on different types of UE.

Various embodiments access network interface 206 for OS 208 to send downlink or uplink messages using underlying hardware of UE 141. The user equipment running a custom UX may securely pass traffic to UXMS 220 on startup or to check for UX updates. A pipeline passes code for microservices (e.g., a camera driver, a third-party application, or an operating system service) in the form of UX updates to UE 141 in some embodiments. The user equipment may prompt users to accept/delay/reject updates to individual UX elements. UE 141 requests updates to its UX elements, and UXMS 220 pushes updates to the microservices.

Figures 3, 4:
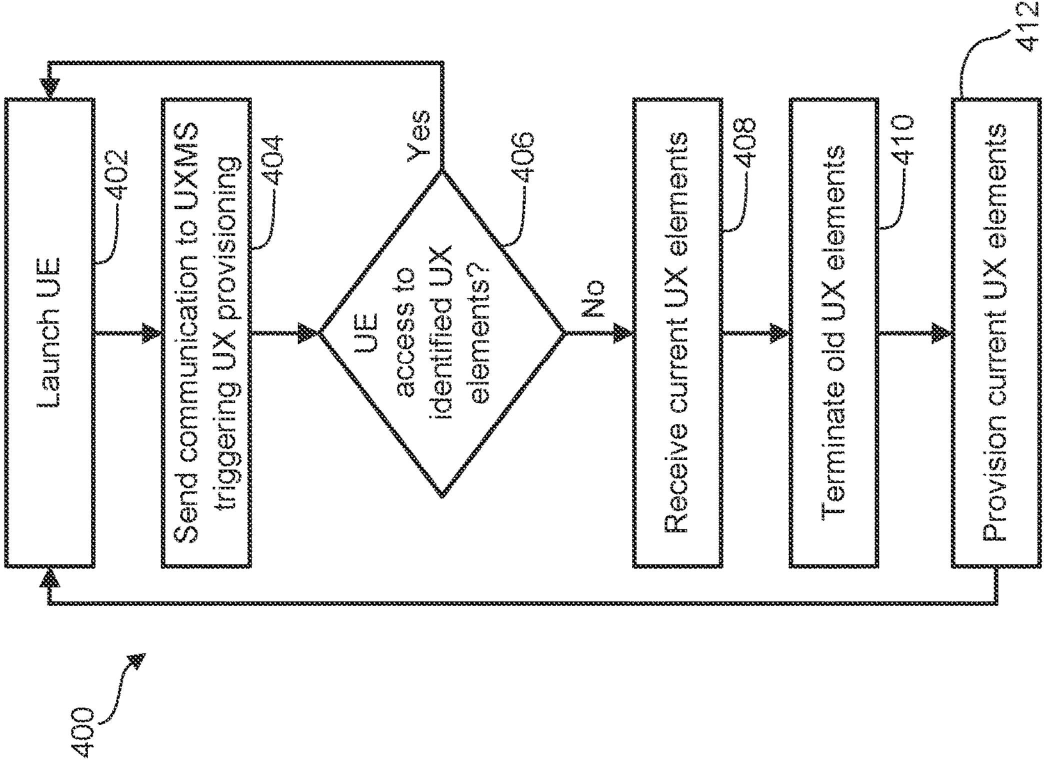
FIG. 3 illustrates an example process for execution by user equipment to deliver a custom user experience on a cellular network, in accordance with various embodiments.
FIG. 4 illustrates an example process for execution by a user experience management system to deliver a custom user experience on a cellular network, in accordance with various embodiments.

Referring now to FIG. 3 and with continuing reference to FIG. 2, process 300 is shown for execution by UXMS 220, in accordance with various embodiments. A guest operator generates a UX config directed to UE based on an identifier (Block 302) using UXMS 220. The UX config is generated using tools made available by UXMS 220 to guest operators and is retained by UXMS 220. A communication including an identifier is received from UE 141 communicating on cellular network 218 (Block 304). The communication may be a request to connect UE 141 to cellular network 218, a request to validate a UX configuration deployed on UE 141, a request to UXMS 220, a communication to other user equipment, a text message, a voice call, or any other communication using cellular network 218. In some embodiments, the communication is triggered in response to booting UE 141 or in response to UE 141 moving between cell sites in cellular network 218. The communication may also be a request for validation sent by UE 141 in response to launching an application or other UX element. The identifier may comprise a device identifier, a device type, or GID parameters from a SIM card in various embodiments.

UXMS 220 supporting cellular network 218 retrieves a list of UX elements deployed to or accessible by UE 141 in response to receiving the communication (Block 306). The list may comprise current versions and settings for all or some of the UX elements deployed on or accessible by UE 141. The list may be the empty list in some embodiments. The list may also include particular UX elements identified in the communication from UE 141, or it may include all UX elements presently accessible by UE 141. UXMS 220 may retrieve the list from database 230, from an argument passed in a function call, or from data contained in the communication from UE 141, for example.

UXMS 220 checks whether UE 141 has access to the UX elements on the list (Block 308). UXMS 220 may perform the check by retrieving a current version number of a UX element from database 230 associated with an application and comparing the current version number to the version number of the application that is deployed on UE 141. The check may also be performed by comparing a hash of the current application or downloadable content to a hash of the application or downloaded content deployed to UE 141. Using a newly computed hash value from the deployed UX element may enable UXMS 220 to detect corruption in the UX element as well as outdated revisions or settings. UXMS 220 may also retrieve information identifying the deployed UX elements from database 230 or from communication with UE 141. UXMS 220 may perform the check for each UX element on the list (e.g., compiled in Block 306).

UXMS 220 transmits the current UX elements and settings to UE 141 (and settings to network services 228 in some embodiments) in response to determining the UX elements running on UE 141 or accessible by UE 141 are incorrect (Block 310). A UX element may be invalid in response to having an outdated revision number, an incorrect hash value, an incorrect application identifier, an incorrect branding, an incorrect billing setting, incorrect access to network services 228, or other incorrect UX elements. UXMS may take no action, or it may verify to UE 141 that no update has been triggered in response to determining that the UX accessible by or running on UE 141 is valid. UXMS 220 monitors third-party apps or other software deployed to UE 141 in some embodiments.

With reference to FIG. 4 and continuing reference to FIG. 2, process 400 is shown for execution by UE 141, in accordance with various embodiments. UE 141 is launched (Block 402). UE 141 may be launched for the first time or rebooted, for example, to start process 400. Other triggering events may also launch process 400 by triggering a communication to UXMS 220.

UE 141 sends a communication to UXMS 220 triggering provisioning of UX elements (Block 404). The communication may be sent directly or indirectly to UXMS 220. Examples of direct communications include transmissions identifying an IP address of UXMS 220 or a function call directly to UXMS 220. Examples of indirect communication may include authenticating with cellular network 218, a first registration of UE 141 with cellular network 218, communications establishing connection with a cell site, receiving or sending data on cellular network 218, or other communications that a host or guest operator (e.g., host 101 and guest 102 of FIG. 1) can use to trigger provisioning by UXMS 220 (e.g., host UXMS 106 aligning UE 141 with UX config 107).

UE 141 receives communication from UXMS 220 indicating whether the accessible UX elements are current (Block 406). If the UX elements are outdated, UE 141 receives the current revision of applications, settings, or downloadable content from UXMS 220 (Block 408). The current UX elements may be a newer version or may be a rollback to an older version. In some embodiments, the current revision is a complete replacement of the dated UX elements.

Embodiments of UE 141 may install the received UX elements by terminating or deleting the dated UX elements if running or installed (Block 410). A running UX element may be terminated without terminating or restarting UE 141 in some embodiments. Some embodiments tend to avoid replacing executing code or overwriting in-use visual elements. The OS may lock updates from a particular UX element in response to the UX element being in use. New code for application updates may be stored in a database, memory, or cache and executed once the lock for updates expires in response to an application ceasing operation. User equipment may run a check before running updated UX elements to determine whether the UX element is in use. If old elements are not in use, then the OS may switch to running new elements. The OS may also kill the old elements if the process was still running, for example if the process was idling.

UE 141 updates the UX element to the current version (Block 412). The old UX element may be overwritten on permanent storage while the old element is still running in some embodiments. The current version of the UX element is launched in response to installing the current version or in response to terminating the old version. Tags relating to the old element are overwritten or replaced with tags relating to the current version. An updated UX element may thus be subject to different access limits to resources than the dated version of the UX element previously installed.

Various embodiments include customization on the network connected to a device. A brand identified during activation of the device may impact the services and features available to the device. For example, a device provisioned by a certain brand may direct a user to that brand's customer service center in response to the user dialing 611 (or any other predetermined number). In another example, a prepaid brand may direct its customers to its own URL in response to the minutes available on a prepaid device dropping below a threshold value.

In another example, SIM-based branding enables a network to configure parameters specific to devices based on the SIM coding. The network may control and update the devices preferred network name, group ID 1 (e.g., a top-level brand), group ID 2, (e.g., a sub-level brand), and the name to display on an operator list. The customized fields and other UX elements may be used by the device, the operating system on the device, or applications installed on the device.

In various embodiments, a device derives branding based on values written to the SIM. For example, the device may be configured to operate on its home network only to disable roaming in response to the SIM coding. The device could also be restricted to 4G service only in response to SIM coding. The SIM coding identifies a brand in the GID fields, and different brands control various network settings for devices connected on their brand. The disclosed approach to access management using SIM-coded brands differs from traditional, actively managed access.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment (for example, A and B, A and C, B and C, or A and B and C).

References to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

What is claimed is:

1. An automated process comprising:

generating, by a guest operator of a cellular network, a user-experience (UX) configuration comprising branding for the guest operator, wherein the UX configuration corresponds to a group identifier (GID) parameter;

receiving, by the cellular network, a communication including the GID parameter from a user device, wherein the user device reads the GID parameter from a subscriber identity module (SIM) card installed in the user device;

identifying, by the cellular network, a plurality of UX elements from the UX configuration corresponding to the GID parameter from the SIM card, the UX elements comprising the branding for the guest operator;

determining, by the cellular network, a UX element from the plurality of UX elements is currently unavailable on the user device; and provisioning, by the cellular network, the UX element to the user device in response to identifying the UX element as currently unavailable on the user device.

2. The automated process of claim 1, wherein identifying the plurality of UX elements comprises retrieving a list using the GID parameter, wherein the list includes the UX elements from the UX configuration.

3. The automated process of claim 1, wherein generating the UX configuration comprises:

selecting the UX elements for the UX configuration associated with a demographic;

assigning the GID parameter to the demographic; and storing the UX configuration comprising the selected UX elements, wherein the UX configuration is stored in association with the GID parameter.

4. The automated process of claim 3, further comprising selecting the SIM card from a plurality of SIM cards to provision the UX elements associated with the GID on the user device.

5. The automated process of claim 1, wherein provisioning the user device with the UX element comprises updating a network service to authorize access to the UX element by the user device.

6. The automated process of claim 1, wherein provisioning the user device with the UX element comprises transmitting a visual element to the user device.

7. The automated process of claim 1, wherein provisioning the user device with the UX element comprises installing an application on the user device.

8. The automated process of claim 1, wherein a guest operator selects the UX elements for provisioning by a mobile network operator (MNO) of the cellular network.

9. An automated process comprising:

generating, for storage by a cellular network, a plurality of user-experience (UX) configurations, wherein a UX configuration from the plurality of UX configurations comprises branding for a guest operator of the cellular network;

receiving, by the cellular network, a communication from a user device, the communication including an identifier corresponding to the UX configuration from the plurality of UX configurations;

retrieving, by the cellular network, the UX configuration corresponding to the identifier, wherein the UX configuration includes a plurality of UX elements including the branding for the guest operator;

identifying, by the cellular network, a UX element from the plurality of UX elements as unavailable on the user device; and provisioning, by the cellular network, the UX element comprising the branding to the user device in response to identifying the UX element as unavailable on the user device.

10. The automated process of claim 9, wherein the identifier comprises a device identifier or a group identifier.

11. The automated process of claim 9, wherein generating the UX configuration comprises:

selecting the UX elements for the UX configuration associated with a demographic;

assigning the identifier to the demographic; and storing the UX configuration comprising the selected UX elements in association with the identifier.

12. The automated process of claim 9, wherein provisioning the user device with the UX element comprises updating a network service to authorize access to the UX element by the user device.

13. The automated process of claim 9, wherein provisioning the user device with the UX element comprises transmitting a visual element to the user device.

14. The automated process of claim 9, wherein provisioning the user device with the UX element comprises installing an application on the user device.

15. The automated process of claim 9, wherein a guest operator selects the UX elements for provisioning by a mobile network operator (MNO) of the cellular network.

16. A process for execution by a user device with a subscriber identity module (SIM) card installed, comprising:

transmitting, by the user device, a communication from the user device to a cellular network hosting the user device, the communication including a group identifier (GID) from the SIM card associated with a user experience (UX) configuration for the user device;

identifying, by the cellular network, a UX element for provisioning on the user device in response to the UX configuration associated with the group identifier including the UX element, wherein the UX element comprises branding of a guest operator hosting the user device on the cellular network; and provisioning the UX element comprising the branding for the user device.

17. The process of claim 16, further comprising:

terminating an old UX element running on the user device in response to identifying the UX element for provisioning;

installing the UX element on the user device to replace the old UX element; and launching the UX element on the user device.

18. The process of claim 16, wherein the UX configuration inherits the UX element from a parent UX configuration.

19. The process of claim 16, wherein the UX configuration comprises top-level UX elements for the user device comprising a software library, and a second UX configuration comprises sub-level UX elements for the user device including the branding.

20. The process of claim 1, further comprising provisioning the SIM card on the user device, the SIM card including the GID parameter.

* * * * *